Patented July 3, 1951

2,558,772

UNITED STATES PATENT OFFICE 2,558,772

INSECTICIDAL AND ACARICIDAL COMPOSITION COMPRISING PROPYLENE GLYCOL AND AN ALKALI AMMONIUM SELENO SULFIDE

Joseph B. Moore, Edina, Minn., assignor to McLaughlin Gormley King Company, Minneapolis, Minn., a corporation of Minnesota No Drawing. Application June 21, 1948,
Serial No. 34,350

5 Claims. (Cl. 167—14)

This invention relates to insecticidal compositions and particularly to those having pronounced acaricidal properties. The invention also relates to and it is an object of the invention to provide compositions capable of being diluted in water to form solutions or dispersions which are effective against a variety of insects and particularly against mites and the eggs of mites, such as Pacific mite, *Tetranychus pacificus* McG.; European red mite, *Paratetranychus pilosis* C. & F.; rust mites, *Eriophiydae;* citrus red or purple mite, *Paratetranychus citri* McG.; six-spotted mite, *Tetranychus sexmaculatus* Riley; brown mite, *Bryobia praetiosa* Koch; two-spotted mite, *Tetranychus bimaculatus;* on their host plants, such as citrus trees, apples, pears and other deciduous and coniferous trees and on shrubs, rose bushes and grapes.

It is an object of the invention to provide an improved insecticidal-acaricidal composition of especial effectiveness against mites and their eggs capable of use in dilute form where the carrier is water.

The invention involves the use of alkylene, dialkylene, trialkylene and polyalkylene glycols, such as propylene glycol, ethylene glycol, diethylene glycol and other liquid glycols having molecular weights not exceeding 630 and preferably those containing from 2 to 6 carbon atoms which are liquid at normal temperatures, in conjunction with alkali ammonium seleno sulfide for which the formula is approximately $(AlkNH_4S)_5Se$, said compounds being described in Patent No. 2,017,594. The compound potassium ammonium seleno sulfide, having the probable formula $(KNH_4S)_5Se$, is preferred because potassium is a plant food and the availability of the potassium in the insecticide is beneficial to the plant metabolism, in addition to the beneficial effect of the compound as a whole in controlling insect infestation. The alkali ammonium seleno sulfides are readily soluble in water and are customarily sold in water solution containing 33% by weight of the insecticide or 8% by weight of the insecticide. It is preferred to employ such commercially available aqueous solutions of the insecticide which is sold under the name "Selocide," but, if desired, equivalent solutions of lesser or greater concentration may be used, so long as appropriate amounts of the insecticidal material are contained therein. The words "alkali ammonium seleno sulfide," "potassium ammonium seleno sulfide," "sodium ammonium seleno sulfide," used herein and in the claims, will be understood to mean the commercially available aqueous solution containing approximately 33% of active insecticidal material unless otherwise stated. Where the term "equivalent" is used in the specification or claims, it will be intended to mean a smaller amount of more concentrated solution or a large amount of more dilute solution containing an amount of active ingredient approximately equal to that contained by a prescribed amount of the standardized commercial solution of active insecticidal-acaricidal ingredient.

In preparing the insecticidal-acaricidal composition there is admixed from 1 to 4 parts by volume of the glycol with 1 to 4 parts by volume of 33% solution of alkali ammonium seleno sulfide, or an equivalent amount of stronger or weaker solution. The so-formed mixture is a homogenous, dark reddish-brown colored, clear, stable liquid insecticidal concentrate which is marketed as such. It is diluted with water to prepare spray composition for direct application.

The insecticidal-acaricidal compositions of the present invention are utilized for wet spraying purposes. Considerable variation is possible in the amount of water used to dilute, depending upon the type of spraying equipment available and the spray methods of the particular operator. In general, however, it has been found desirable to use from 1 to 3 quarts of the concentrate per 100 gallons of water in the final spraying material. It is also preferable that the user add a spreading agent such as calcium caseinate, potassium caseinate, soap or the like. Thus, the user may add one-fourth pound, more or less, of spreader for each 100 gallons of final spraying solution.

An advantage of the invention resides in the fact that the glycol-alkali ammonium seleno sulfide concentrate is compatible with dichlor diphenyl tricloro ethane (DDT, trade-mark) which may, therefore, be added without disturbing the effectiveness of the remaining ingredients. The glycol of the composition has a synergistic effect in respect to the alkali ammonium seleno sulfide, the killing effect of the composition being greater than that of equal concentrations of alkali ammonium seleno sulfide or the glycol used alone.

The final spray material made from the aforesaid insecticidal-acaricidal concentrate has exceptional value for use as an agricultural spray, particularly for controlling infestation of mites, such as Pacific mite, *Tetranychus pacificus* McG.; European red mite, *Paratetranychus pilosis* C. & F.; rust mites, *Eriophiydae;* citrus red or purple mite, *Paratetranychus citri* McG.; six spotted mite, *Tetranychus sexmaculatus* Riley; brown mite, *Bryobia praetiosa* Koch; two-spotted mite, *Tetranychus bimaculatus*.

An especial advantage of the invention resides in the fact that the spray composition does not kill the predators of the mites. The glycol-alkali ammonium seleno sulfide spray solutions of the present invention have a considerably greater and more rapid killing effect upon the eggs of the mites, and prevent practically all the eggs from hatching, which is not the case where sprays of alkali ammonium seleno sulfide or the glycol are used alone. Moreover, the spray appears to have no deleterious effect upon the plant material treated therewith and overcomes serious disadvantages due to yellowing and spotting of leaves and fruit, darkening of skin and blackening of the lenticils of pears occasioned by the commonly used sprays of alkali ammonium seleno sulfide and spray oil under conditions of extremely hot weather. Thus, sprays of alkali ammonium seleno sulfide and spray oil, now commonly used, cause considerable damage to the leaves and fruit, particularly where exposed to strong sunlight. None of these defects occurs in connection with the use of sprays prepared from the glycol-alkali ammonium seleno sulfide compositions of the present invention.

By way of further illustrating the invention, but without limitation thereon reference is made to the following examples:

*Example I*

Propylene glycol—one pint.
Potassium ammonium seleno sulfide (33% commercial grade aqueous solution)—one pint.

For use the composition is diluted in from 50 to 100 gallons of water and utilized in the customary manner as a spray. Preferably a spreader, such as calcium caseinate is added in the amount of one-quarter pound for each 100 gallons of final spray mixture. Such a spray is especially effective against mites and their eggs and does not kill predators of mites, which is very important.

*Example II*

Propylene glycol—one pint.
Potassium ammonium seleno sulfide (33% commercial grade aqueous solution)—one pint.
DDT (50% strength wettable)—one and one-half pounds.

For use the composition is diluted in from 50 to 100 gallons of water and utilized in the customary manner as a spray, one-quarter pound of calcium or potassium caseinate being added for each 100 gallons of spray. The spray is especially effective against mites and their eggs and against codling moths, apple leaf hopper and San Jose scale.

*Example III*

Ethylene glycol—one pint.
Potassium ammonium seleno sulfide (33% commercial aqueous solution)—one pint.

For use the composition is diluted in from 50 to 100 gallons of water and utilized in the customary manner as a spray, one-quarter pound of calcium or potassium caseinate being added for each 100 gallons of spray. The spray is especially effective against mites and their eggs.

A spray was prepared utilizing the composition of Example I and was made into 100 gallons of spray with one-quarter pound calcium caseinate as a spreader, as in that example, and Delicious apple trees, which were heavily infested with mites, were sprayed. There was no burning or yellowing of the leaves that had been injured by the mites. The kill of mites and the eggs was more than 99%. By way of comparison the use of the same insecticide-acaricide, namely potassium ammonium seleno sulfide with one-third percent spray oil and spreader diluted to equal concentration in water, produced a lower level of kill of the mite eggs on a control tree, and the leaves which had been injured by the mites were considerably damaged by the spray.

In another application 1500 gallons of spray were prepared utilizing one quart of the composition of Example I and one-quarter pound calcium caseinate as a spreader for each 100 gallons of water. The spray was applied to apple trees of the Jonathan, Delicious and Winesap varieties. There was no burning or yellowing of the leaves and the mite kill was excellent. The mites were dead by the time the trees were dry and the eggs collapsed in one day. The kill of mites and eggs was 99.9%.

Another 100 gallons of spray material was made utilizing the composition of Example I, as therein described, and was applied to apple trees of the Delicious variety and to pears of the D'Anjou variety. There was no injury to either the apple or pear trees or fruit. It may be noted that the use of spray solutions of potassium ammonium seleno sulfide in water or a spray of that material and spray oil in water, in accordance with the ordinary commercial use normally produces a slight darkening of the skin of the D'Anjou pear. This was absent in the present instance utilizing the composition of Example I. There was no blackening of the lenticils. The kill of mites and eggs (which were of the Pacific and European red types) was 99.9%.

These sprayed blocks of trees were observed until harvested. At harvest time the fruit sprayed with the composition of the present invention had a much better color and size. Those sprayed with the composition of this invention produced 40 boxes of grade Fancy or better apples out of a total of 55 boxes, whereas control trees sprayed with potassium ammonium seleno sulfide and oil produced only 9 boxes of grade Fancy or better out of a total of 30 boxes. In each instance the fruit was picked and graded for color and size. The trees treated and the control trees were otherwise the same and were adjacent.

As many apparently widely different embodiments of this invention may be made without departing from the spirit and scope thereof, it is to be understood that I do not limit myself to the specific embodiments herein.

What I claim is:

1. A water miscible spray composition for agricultural spraying purposes comprising 1 to 4 parts by volume of propylene glycol and 1 to 4 parts by volume of an aqueous solution of potassium ammonium seleno sulfide.

2. A water miscible spray composition for agricultural spraying purposes comprising propylene glycol and alkali ammonium seleno sulfide.

3. A water miscible spray composition for agricultural spraying comprising propylene glycol and an aqueous solution of potassium ammonium seleno sulfide equivalent to a volume of 33% aqueous solution of potassium ammonium seleno sulfide which is approximately equal to the volume of glycol.

4. An agricultural spray composition comprising 1 to 3 quarts of a concentrated insecticidal-acaricidal spraying composition of propylene glycol and an aqueous solution of potassium ammonium seleno sulfide for each 100 gallons of water and a spreader.

5. An agricultural spray composition comprising a major proportion of water and a minor proportion of insecticidal-acaricidal composition, said composition containing from 1 to 4 parts of propylene glycol and from 1 to 4 parts of an aqueous solution of potassium ammonium seleno sulfide.

JOSEPH B. MOORE.

REFERENCES CITED

The following references are of record in the file of this patent:

UNITED STATES PATENTS

| Number | Name | Date |
| --- | --- | --- |
| 2,017,594 | Gnadinger | Oct. 15, 1935 |
| 2,333,124 | Robertson et al. | Nov. 2, 1943 |

OTHER REFERENCES

Wigglesworth: Brit. Med. Bull., vol. 3, No. 9–10, page 235 (1948).

Osol et al.: U. S. Dispensatory, 24th edition, J. B. Lippincott Co., Phil., (1947), page 940.